US012375309B2

(12) United States Patent
Alsadah et al.

(10) Patent No.: US 12,375,309 B2
(45) Date of Patent: Jul. 29, 2025

(54) METHOD AND SYSTEM FOR PIPE COMPONENT MANAGEMENT USING DISTRIBUTED LEDGER TECHNOLOGY

(71) Applicant: SAUDI ARABIAN OIL COMPANY, Dhahran (SA)

(72) Inventors: Aqeel Alsadah, Sayhat (SA); Mohammed Aboulsamh, Dhahran (SA); Abdulaziz Almuhaisin, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 510 days.

(21) Appl. No.: 17/822,730

(22) Filed: Aug. 26, 2022

(65) Prior Publication Data
US 2024/0073041 A1 Feb. 29, 2024

(51) Int. Cl.
*G06Q 30/00* (2023.01)
*G06Q 10/087* (2023.01)
(Continued)

(52) U.S. Cl.
CPC ............ *H04L 9/50* (2022.05); *G06Q 10/087* (2013.01); *G06Q 30/018* (2013.01);
(Continued)

(58) Field of Classification Search
CPC ... H04L 2209/805; H04L 9/50; H04L 9/0825; H04L 9/0894; H04L 9/3263; G06Q 10/087; G06Q 30/018
See application file for complete search history.

(56) References Cited

U.S. PATENT DOCUMENTS 10,523,443 B1 * 12/2019 Kleinman ................ H04L 9/30
10,554,405 B1 * 2/2020 Endress ................... H04L 9/30
(Continued)

FOREIGN PATENT DOCUMENTS

CN 111163182 B 8/2021
EP 3454272 A1 * 3/2019 ............. G06Q 40/04

OTHER PUBLICATIONS

Wang, Shangping, et al. "Smart Contract-Based Product Traceability System in the Supply Chain Scenario." IEEE Access, vol. 7, 2019. (Year: 2019).*
(Continued)

*Primary Examiner* — Luis A Brown
(74) *Attorney, Agent, or Firm* — Osha Bergman Watanabe & Burton LLP (57) ABSTRACT

A system may include a user device and various blockchain nodes coupled over a network. The system may further include a server coupled to the user device and the blockchain nodes over the network. The server may obtain pipe data in response to a scan of a machine-readable tag associated with a received pipe component. The server may further perform a comparison of the received pipe component and a pipe component using the blockchain nodes, the pipe data, and a digital pipe certificate that is disposed in a distributed ledger. The server may further determine whether the received pipe component matches the pipe component based on the comparison of the received pipe component and the pipe component. The server may further transmit, in response to the received pipe component not matching the pipe component, a command that sends the received pipe component to a predetermined return location.

12 Claims, 5 Drawing Sheets

(51) Int. Cl.
*G06Q 30/018* (2023.01)
*H04L 9/00* (2022.01)
*H04L 9/08* (2006.01)
*H04L 9/32* (2006.01)

(52) U.S. Cl.
CPC .......... *H04L 9/0825* (2013.01); *H04L 9/0894* (2013.01); *H04L 9/3263* (2013.01); *G06Q 2220/00* (2013.01); *H04L 2209/805* (2013.01)

(56) References Cited

U.S. PATENT DOCUMENTS

| | | | | |
|---|---|---|---|---|
| 10,880,070 | B1* | 12/2020 | Delaney | G06F 21/64 |
| 10,958,663 | B2 | 3/2021 | Simons | |
| 11,010,706 | B1* | 5/2021 | Wier | G06Q 10/0837 |
| 11,037,095 | B2* | 6/2021 | Kim | G06Q 10/0833 |
| 11,070,381 | B2* | 7/2021 | Qiu | H04L 9/006 |
| 11,074,353 | B2* | 7/2021 | Wojcik | H04L 9/50 |
| 11,195,145 | B2* | 12/2021 | Fuller | H04L 9/3236 |
| 2018/0349968 | A1* | 12/2018 | O'Brien | H04L 9/3297 |
| 2019/0081773 | A1 | 3/2019 | Klarman et al. | |
| 2019/0081777 | A1 | 3/2019 | Klarman et al. | |
| 2020/0028688 | A1* | 1/2020 | Takada | H04L 9/3247 |
| 2020/0118117 | A1* | 4/2020 | McManus | G06Q 20/06 |
| 2020/0193367 | A1* | 6/2020 | Levy | G06K 19/0723 |
| 2020/0242313 | A1* | 7/2020 | Lemsitzer | G06K 19/0723 |
| 2020/0294048 | A1* | 9/2020 | Ye | H04L 63/123 |
| 2021/0234921 | A1* | 7/2021 | Gururaj | H04L 67/1001 |
| 2021/0263909 | A1* | 8/2021 | Paracha | G06Q 10/0639 |
| 2021/0326806 | A1* | 10/2021 | Perez | G06Q 10/0837 |
| 2021/0399889 | A1* | 12/2021 | Muthukrishnan | G06Q 20/401 |
| 2023/0073720 | A1* | 3/2023 | Blackburn | G16H 20/13 |
| 2023/0334163 | A1* | 10/2023 | Stephens | G06F 21/6209 |

OTHER PUBLICATIONS

Hasan, Haya, et al. "Smart Contract-based Approach for Efficient Shipment Management." Computers & Industrial Engineering, vol. 136, pp. 149-159, 2019. (Year: 2019).*

Kudryashov S., et al. "Two-Dimensional Barcodes Usage in Plastic Pipes Blockchain-Based Supply-Chain." Journal of Physics: Conference Series, 2020. (Year: 2020).*

Fernandez-Carames, et al. "Towards an Autonomous Industry 4.0 Warehouse: A UAV and Blockchain-Based System for Inventory and Traceability Applications in Big Data-Driven Supply Chain Management." Sensors, vol. 19, No. 2394, 2019. (Year: 2019).*

Zhang, Xue-Jiao, et al. "Research on Feasibility of Traceability and Anti-Counterfeiting of Gas Equipment Based on Blockchain Technology." Proceedings of the International Petroleum and Petrochemical Technology Conference 2020, pp. 633-641, 2021. (Year: 2021).*

Office Action issued by the Saudi Arabian patent office for corresponding Saudi Arabian patent application No. 123450247, mailed Mar. 16, 2025 (9 pages).

* cited by examiner

METHOD AND SYSTEM FOR PIPE COMPONENT MANAGEMENT USING DISTRIBUTED LEDGER TECHNOLOGY

BACKGROUND

Pipe components may be handled by multiple entities prior to being delivered to a specific site for installation. In particular, multiple parties may be responsible for putting a finished pipe product together that has been assembled, coated, and tested according to various desired pipe specifications. Due to the number of entities involved, the possibility exists that an incorrect product or an unsatisfactory product may be delivered to an installation site by accident or fraudulently. Thus, technologies are desired that can provide a product authentication mechanism as well as accurate tracking for pipe components while being transported through a supply chain.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system that includes a user device and various blockchain nodes coupled over a network. A respective blockchain node among the blockchain nodes includes a distributed ledger. The system further includes a server coupled to the user device and the blockchain nodes over the network. The server includes a computer processor. The server obtains pipe data in response to a scan of a machine-readable tag associated with a received pipe component. The server further performs a comparison of the received pipe component and a pipe component using the blockchain nodes, the pipe data, and a digital pipe certificate that is disposed in the distributed ledger. The digital pipe certificate is generated in response to a request by the user device for the pipe component. The server further determines whether the received pipe component matches the pipe component based on the comparison of the received pipe component and the pipe component. The server further transmits, in response to the received pipe component not matching the pipe component, a command that sends the received pipe component to a predetermined return location.

In general, in one aspect, embodiments relate to a method that includes obtaining, from a user device, a request for a pipe component. The method further includes generating, by a first server, a digital pipe certificate associated with the pipe component. The method further includes validating, using various blockchain nodes and a hash function, the digital pipe certificate within a distributed ledger. The method further includes obtaining, by a second server and using the blockchain nodes, pipe data in response to a scan of a machine-readable tag associated with a received pipe component. The method further includes performing, by the second server, a comparison of the received pipe component and the pipe component the pipe data and the digital pipe certificate. The method further includes determining, by the second server, whether the received pipe component matches the pipe component based on the comparison of the received pipe component. The method further includes transmitting, by the second server and in response to the received pipe component not matching the pipe component, a command that sends the received pipe component to a predetermined return location.

In general, in one aspect, embodiments relate to a server that includes a computer processor and a memory coupled to the computer processor. The memory includes instructions executable by the computer processor and that obtain, from a user device, a request for a pipe component. The instructions further generate, in response to obtaining the request for the pipe component, a digital pipe certificate in a distributed ledger that is associated with the pipe component. The instructions further validate, using various blockchain nodes, the digital pipe certificate within the distributed ledger. The instructions further transmit a command that sends the pipe component to a predetermined destination location. A respective blockchain node among the blockchain nodes includes the distributed ledger. The pipe component includes a machine-readable tag that is associated with the digital pipe certificate.

In some embodiments, a server is coupled to the user device and various blockchain nodes over a network. The server may include a computer processor and obtain, from a user device, a request for a pipe component. The server may generate a digital pipe certificate that is associated with the pipe component. The server may validate, using the blockchain nodes, the digital pipe certificate within a distributed ledger. The digital pipe certificate may be validated using the blockchain nodes and a hash function. The pipe component may include a machine-readable tag that is associated with the digital pipe certificate. In some embodiments, a radio frequency identification (RFID) transceiver is coupled to a server. The machine-readable tag may be an RFID tag, and the scan may be performed by the RFID transceiver. In some embodiments, a camera device is coupled to the server. The machine-readable tag may include a quick response (QR) code, and the scan may be performed by the camera device. In some embodiments, a server may include a blockchain wallet that stores a cryptographic public key and a cryptographic private key. The server may obtain pipe data from various blockchain nodes using the cryptographic public key. The server may update the digital pipe certificate using the cryptographic private key in response to sending the received pipe component to a predetermined return location. In some embodiments, a distributed ledger includes a smart contract. A comparison may be determined by executing a blockchain transaction with various blockchain nodes using the smart contract and pipe data. In some embodiments, pipe data include a pipe material type of a pipe component and at least one pipe dimension of the pipe component. In some embodiments, a server obtains inspection data regarding a pipe component associated with a digital pipe certificate. The server may determine whether the pipe component satisfies a predetermined inspection criterion based on the inspection data. The server may transmit, in response to the pipe component failing to satisfy the predetermined inspection criterion, a command that sends the pipe component to the predetermined return location. In some embodiments, a distributed ledger includes a smart contract, and where determining whether a pipe component satisfies a predetermined inspection criterion includes executing a blockchain transaction with various blockchain nodes using the smart contract and the inspection data. In some embodiments, a server obtains inspection data regarding a pipe component associated with a digital pipe certificate. The server may determine whether the pipe component satisfies a predetermined inspection criterion based on the inspection data. The server may transmit, in response to the pipe component satisfying the predetermined inspection criterion, a command that causes a pipe installation operation to be performed using the pipe component. In some embodiments, a server obtains pipe data regarding a pipe component associated with a digital pipe certificate. The server may perform a comparison of the pipe component and a requested pipe component using various blockchain nodes, the pipe data, and the digital pipe certificate that is disposed in the distributed ledger. The server may determine whether the pipe component matches the requested pipe component based on the comparison of the pipe component and the requested pipe component. The server may transmit, in response to the requested pipe component matching the pipe component, a command that sends the pipe component to a predetermined destination location for a pipe installation operation.

In light of the structure and functions described above, embodiments disclosed herein may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using digital pipe certificates in a distributed ledger to manage a pipe distribution. In some embodiments, for example, blockchain technology is used to perform processing for cross-organization transactions, such as product inspections, product deliveries, and product manufacturing. As such, different entities in a pipe distribution system (e.g., customers, intermediary distributors, manufacturers, etc.) may use digital pipe certificates to store pipe data on a respective pipe component as well as update the certificate records based on pipe transactions. In particular, a digital pipe certificate may be a blockchain record that is stored within a blockchain on a computer network.

Additionally, these digital pipe certificates may be implemented using distributed ledger technology. Pipe data in a blockchain network may be encrypted with strict privacy and security controls through various cryptographic techniques. Thus, the distributed ledger technology may provide both data security regarding individual pipe components as well as pipeline traceability through fast information exchanges within the blockchain network. Thus, digital pipe certificates may increase data authenticity inside a supply chain in order to manage supply chain disruptions more effectively for various parties. Thus, various blockchain nodes (e.g., a customer's user devices, customer servers, manufacturer servers, distributor servers, etc.) may be used to validate digital pipe certificates as well as verify pipe transactions.

Furthermore, some embodiments verify and/or automatically perform various pipe transactions using smart contracts. Smart contracts may be software that is programmed within a blockchain to implement specific transaction terms and conditions. In response to an inspection operation or a matching process, for example, pipe data may be sent to a blockchain network based on a received pipe component. In response to receiving the data, a smart contract may be executed by the blockchain network to determine whether a received pipe component passes an inspection criterion (i.e., in the case of inspection operations) or the received pipe component matches a requested pipe component (i.e., in the case of a matching process). Importantly, digital pipe certificates may provide additional reliability of manufacturers and distributors by reducing the number of faulty pipe components. As such, accurate received pipe components that match the requested pipe specifications may increase usage duration.

In some embodiments, digital pipe certificates may be used by Engineering, Procurement, and Construction (EPC) contractors to both ensure the authenticity of pipe data for respective pipe components and accurately track the movement of pipe components. For example, EPC contractors may operate as distributors that receive pipe component requests from customers. After receiving such requests, the EPC contracts may place subsequent requests with pipe manufacturers. Manufacturers may subsequently prepare pipe components according to various pipe specifications and required product certifications. After a pipe component is initially produce, for example, the pipe component may be forwarded to paint coaters before being sent to distributors. Thus, a distributor may deliver the pipe components to customer sites with various certifications and documentations. Customer inspectors may analyze both the physical pipe components and the associated documentation based on a specified inspection level and issue the required certifications. Once inspected and approved, pipe components may be ready to be installed at various locations. Accordingly, some embodiments provide a multilayer verification solution tailored for various pipeline projects using digital pipe certificates as the verification and authentication mechanism.

Figure 1:
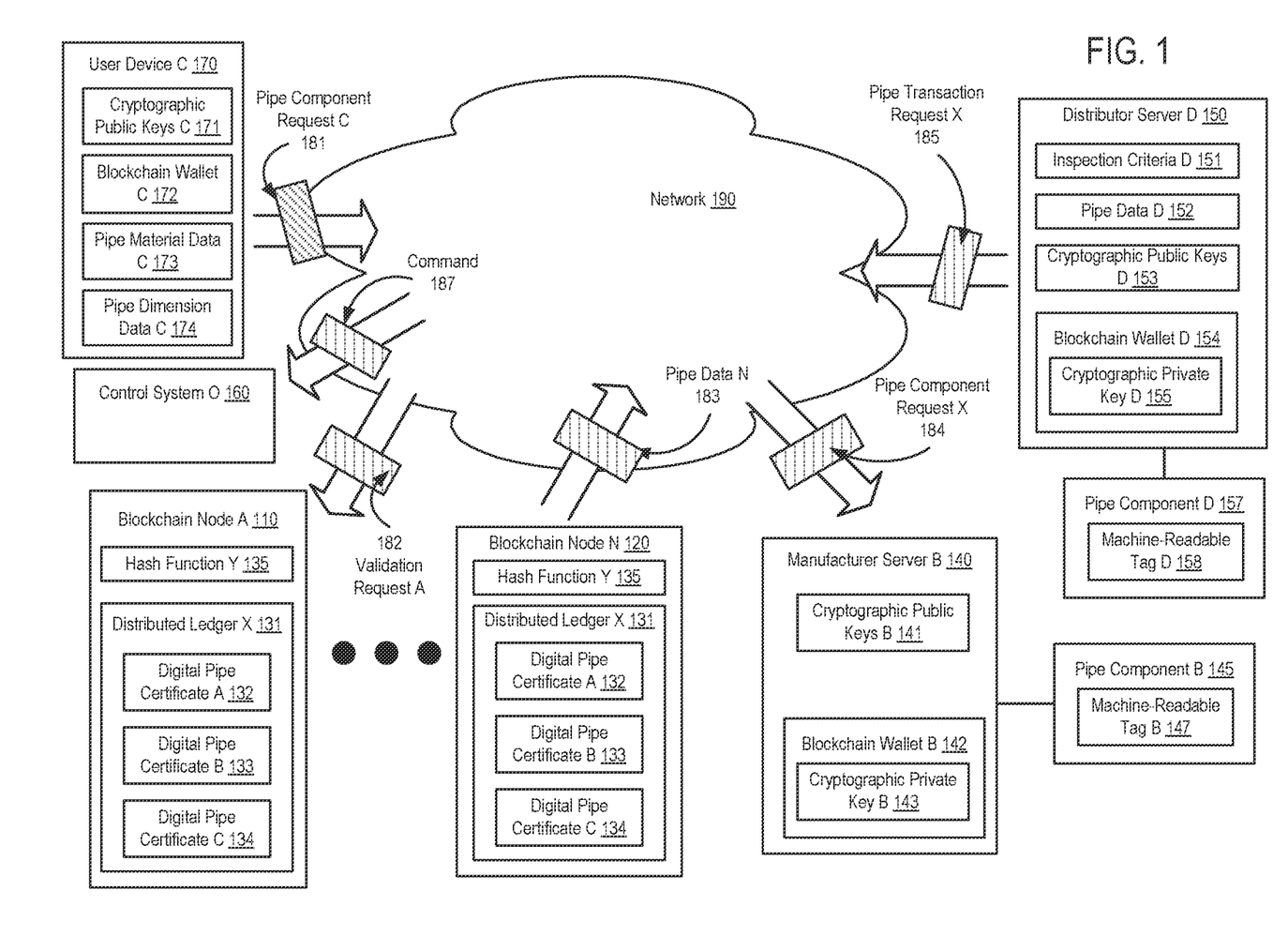
FIG. 1 shows a block diagram of a system in accordance with one or more embodiments.

Turning to FIG. 1, FIG. 1 shows a block diagram of a system in accordance with one or more embodiments. As shown in FIG. 1, a network (e.g., network (190)) may include one or more user devices (e.g., user device C (170)), one or more servers (e.g., a manufacturer server B (140), a distributor server D (150)), and one or more control systems (e.g., control system O (160)). For example, a manufacturing server may be associated with a manufacturer that constructs pipe components in response to a request by a user device associated with a particular customer or EPC contractor. On the other hand, a distributor server may be associated with a distribution entity that is responsible for transporting pipe components from a manufacturing location to one or more intermediate locations prior to delivery at a final destination location for a customer. The network may further include various blockchain nodes (e.g., blockchain node A (110), blockchain node N (120)) that may communicate over the network (e.g., network (190)) with various network devices (e.g., user device C (170), a manufacturer server B (140), and a distributor server D (150)). While FIG. 1 identifies specific network nodes as blockchain nodes, in some embodiments, multiple supply chain entities also operate as respective blockchain nodes, such as user device C (170), manufacture server B (140), and distributor server D (150). Thus, network devices for intermediary distributers, manufacturers, and end-user customers may also serve as blockchain nodes for validating blockchain records and/or storing distributed ledgers.

Blockchain nodes may include functionality for broadcasting blockchain information to other nodes within a blockchain network (e.g., blockchain node A (110), blockchain node N (120)). Blockchain information may be broadcast such as to validate a new blockchain records or verify a blockchain transaction. As such, blockchain information may include requests to perform a new blockchain transaction or generate new blockchain records. As another example, blockchain information may include voting information regarding one or more pending transactions waiting for validation. Blockchain information may also include network information such as destination addresses for communicating with other blockchain nodes in the blockchain network.

Furthermore, a blockchain protocol may use a digital distributed ledger of cryptographically signed transactions that are grouped as blockchain records. A new blockchain record may be cryptographically linked to the previous record after the record's validation. New records may be replicated across copies of a distributed ledger (e.g., distributed ledger X (131)) within a network, and any conflicts may be resolved automatically using established rules. As such, the distributed ledger may be a shared system of records that are stored in a blockchain network and shared among various participant blockchain nodes. Specifically, a blockchain node may be a computing device that includes hardware and/or software with functionality for generating and/or validating blockchain records as well as verifying blockchain transactions. Blockchain nodes may be similar to computer system (502) described below in FIG. 5 and the accompanying descriptions.

Turning to blockchain networks, a blockchain network may be a peer-to-peer network that adheres to protocols for inter-node communication and validation of new blockchain records. For example, a blockchain network may allow two or more participants unknown to each other to perform transactions accordingly. In particular, blocks within a blockchain may be encrypted and protected by a hash function (e.g., hash function Y (135)). When a new blockchain is being mined, a blockchain may be synchronized with other blockchain nodes in the blockchain network. By being decentralized, compromising the blockchain may requires cooperation with a majority of the blockchain nodes, thereby reducing the chance for fraudulent transactions. Transactions on a blockchain may transfer information between various cryptographic public keys.

Some blockchain technologies may implement a public blockchain network or a private blockchain network. A public blockchain network may not store information in a single place, but distributes stored information across a peer-to-peer network. The public blockchain network may then use a verification mechanism to determine the authenticity of data. For example, a consensus method may be used where blockchain nodes reach an agreement on a current state of the distributed ledger. Examples of consensus methods include a proof of work (PoW) mechanism and a proof of stake (PoS) mechanism. Turning to private blockchain networks, a private blockchain network may implement a closed network that is under the control of one or more entities. For example, a private blockchain network may operates similar to a public blockchain network (e.g., using peer-to-peer connections and decentralized storage). However, the private blockchain network may limit which nodes may join the network.

In some embodiments, a private blockchain network may use a permissioned protocol for adding new nodes accordingly. A permissioned protocol may use a form of permission among nodes for a central entity to access the node network, such as for modifying the distributed ledger. On the other hand, in the case of permissionless distributed ledgers, every node in a node network may access a full and updated copy of the entire distributed ledger. In a hybrid distributed ledger technology (DLT), a node protocol may use features based on both permissionless and permissioned protocols. In some embodiments, a permissioned blockchain platform may be used to manage the identities of various nodes (e.g., a manufacturer server, a customer's user device, a distributor's server) and allow these nodes to assert their identity for different pipe transactions.

In some embodiments, pipe data (e.g., pipe data N (183), pipe data D (152)) regarding various pipe components are stored within a blockchain record of a distributed ledger (e.g., distributed ledger X (131)). A blockchain record may store, for example, pipe data and related pipe information, such as the manufacturer's information, the current location of a pipe component, a record of previous locations of the pipe component, previous entities in possession of the pipe component, the date of manufacturing, the date that a customer requested the pipe component. Likewise, a blockchain record that include pipe data may be referred to as a "digital pipe certificate." However, other distributed ledger technologies are contemplated for implementing digital pipe certificates in addition to blockchain technology.

In some embodiments, digital pipe certificates (e.g., digital pipe certificate A (132), digital pipe certificate B (133), digital pipe certificate C (134)) provide an authentication mechanism for pipe components. For example, a blockchain network may provide a distributed online repository of all digital pipe certificates relating to one or more pipe components. Authorized users may access this distributed online repository to verify online a product's origination and its chain of custody via a tamper proof distributed ledger. The distributed ledger may be verified by some or all network entities in a blockchain network. Digital pipe certificates may also provide component traceability. For example, digital pipe certificates may be used to provide visibility of the status and/or location of various pipe components as they move throughout a supply chain. As such, component movements may be recorded by various entities using digital signatures associated with their cryptographic private keys (e.g., cryptographic private key B (143), cryptographic private key D (155)). For example, only a manufacturer server may be able to sign a digital pipe certificate to indicate that manufacturing of the respective pipe component is complete.

In some embodiments, a digital pipe certificate is associated with a machine-readable tag (e.g., machine-readable tag B (147), machine-readable tag D (158)) coupled to a pipe component (e.g., pipe component B (145), pipe component D (157)). The machine-readable tag may identify a particular digital pipe certificate and/or a cryptographic public key for identifying the digital pipe certificate. In response to scanning a machine-readable tag, for example, a machine-readable tag may provide an address of a digital pipe certificate within a blockchain network. The machine-readable tag may also include other blockchain information, such as a particular blockchain network or a block ID for the digital pipe certificate. Examples of machine-readable tags include a radio frequency identification (RFID) tag, barcodes, quick response (QR) codes, and other machine-readable labels. In another example, a machine-readable label may include a GS1 data matrix, which may be printed as a square or rectangular symbol made up of individual dots.

Turning to RFID tags, an RFID tag may include an integrated circuit (IC), an antenna, and a substrate. The part of an RFID tag that encodes identifying information may be referred to as the RFID inlay. RFID tags may include active RFID tags, passive RFID tags, and semi-passive RFID tags. An active RFID tag may have its own power source, often a battery. A passive RFID tag may receive its power from a reading antenna, whose electromagnetic wave induces a current in the RFID tag's antenna. Semi-passive RFID tags may include a battery that operates some circuitry while communication may be powered by an RFID reader. RFID tags may include read-only tags or read-write tags, where data may be added or adjusted by an RFID reader. In some embodiments, an RFID tag is part of a smart label. For example, a smart label may have an RFID tag embedded into an adhesive label and feature an additional barcode, thus allowing use by both RFID readers and barcode readers.

Turning to RFID systems, RFID systems may include low frequency (LF) systems, high frequency (HF) systems, ultra-high frequency (UHF) systems, and microwave RFID systems. Thus, RFID frequencies may range from 30 KHz (i.e., in a low frequency system) to 2.45 Ghz (i.e., in microwave frequency systems). An RFID system may include a scanning antenna, an RFID transceiver, and a transponder (i.e., the RFID tag). A scanning antenna and an RFID transceiver may be combined to form an RFID reader. RFID readers may be fixed or mobile readers, where an RFID reader may be a network-connected device that is portable or permanently attached to a particular location. An RFID reader may use radio waves to transmit signals that activate an RFID tag. Once activated, the RFID tag may transmit a return RF wave back to the antenna in an RFID reader.

Keeping with machine-readable tags, a machine-readable tag may be scanned by a camera device to obtain pipe data. For example, a camera device (such as the camera device in a smartphone) may include an integrated application that includes functionality for converting a scan of a machine-readable label into data. In particular, a camera device may scan a QR code and the integrated application may provide a QR reader for interpreting the QR code. After scanning the machine-readable tag, a network device coupled to the camera device may identify a digital pipe certificate in a similar manner as performed by RFID readers with RFID tags. Using machine-readable tags, a network may implement pipeline traceability to increase the speed of information exchange and ensure data authenticity inside a pipe supply chain.

In some embodiments, an inspection operation is performed on a pipe component at different locations in a supply chain. Once a customer receives a requested pipe component, an inspection operation may determine whether a pipe component satisfies one or more predetermined inspection criteria. More specifically, inspection criteria may correspond to pipe material data (e.g., pipe material data C (173)) and/or pipe dimension data (e.g., pipe dimension data C (173)). For example, the inspection criteria may correspond to the specific pipe materials or pipe dimensions found in the initial pipe component request (e.g., pipe component request C (181), pipe component request X (184)). On the other hand, the inspection criteria may be separate from the original component specifications. For example, inspection criteria (e.g., inspection criteria D (151)) may be used to analyze a pipe component for damage that occurred during transportation to an installation location or from manufacturing defects. Likewise, a digital pipe certificate may store inspection data for one or more inspection operations performed prior to delivery to a customer's site. For example, different entities may update a digital pipe certificate using their cryptographic private keys to describe the results of different inspection operations performed at different locations.

Keeping with blockchain technology, a network device (e.g., user device C (170), manufacturer server B (140), and distributor server D (150)) may also store various cryptographic keys for accessing and/or updating a digital pipe certificate. For example, cryptographic keys may include public and private keys that are stored in one or more blockchain wallets (e.g., blockchain wallet B (172), blockchain wallet C (142), and blockchain wallet D (154)). In particular, a blockchain wallet may be an application that includes hardware and/or software with functionality for obtaining data from a digital pipe certificate and/or updating the digital pipe certificate within a pipe transaction (i.e., a blockchain transaction regarding a digital pipe certificate).

Furthermore, digital pipe certificates may also implement various smart contracts in a blockchain network. A smart contract may automatically verifies pipe transactions by identifying the relevant terms and conditions of a respective pipe transaction and outputting an analysis of the pipe transaction (e.g., in response to a pipe transaction request X (185)). For example, smarts contracts may determine whether a received pipe component matches a customer's request for a pipe with specific material and design specifications.

In some embodiments, a blockchain network uses digital signatures to streamline the communication process for generating, validating, and/or updating digital pipe certificates. For example, different entities may have different digital signatures associated with different cryptographic private keys stored among different entities in a supply chain. Examples of entities with unique digital signatures may include customers requesting particular pipe components, pipe component manufacturers, pipe inspectors, and other parties involved in the supply chain. For example, a digital signature scheme may be used by various parties to verify the authenticity of a received pipe component as well as track the pipe component at different supply locations.

In some embodiments, a user performs a pipe transaction that updates a digital pipe certificate. For example, the pipe transaction may be executed by a particular pipe entity by signing an update to a certificate with their cryptographic private key. Thus, cryptographic private keys may provide a mechanism for verification and/or proving authority for a pipe transaction. Finally, pipe data may be encrypted with the cryptographic public key (e.g., cryptographic public keys B (141), cryptographic public keys C (171), cryptographic public keys D (153)) of the certificate's owner and other pipe entities that may obtain the cryptographic public key in order to read the pipe data.

Turning to user devices, a user device (e.g., user device C (170)) may provide a graphical user interface for communicating with different nodes in a network. For example, a user device may be a personal computer, a human-machine interface, a smartphone, or another type of computer device for presenting information and obtaining user inputs in regard to the presented information. Likewise, the user device may obtain various user selections in regard to requesting pipe components, such as by requesting a particular type of pipe component (e.g., based on pipe material data C (173) and/or pipe dimension data C (174)). Likewise, the user device may display various status reports that describe pipe components moving through a supply chain.

Turning to distributed ledger technologies, other distributed ledger technologies are contemplated in addition to blockchains. For example, digital pipe certificates may be implemented using hashgraphs, directed acyclic graphs, and various hybrid implementations of different distributed ledger technologies. In particular, a distributed ledger may be implemented using multiple nodes over a network, where a node protocol may determine which entities (e.g., any person or only approved entities) can operate nodes to validate transactions (e.g., in response to a validation request A (182)). Different distributed ledger technologies may also use different consensus algorithms, such as a proof of work, a proof of stake, a voting system, and/or hashgraphs. Thus, a distributed ledger technology may ensure that changes to a particular ledger are reflected throughout a node network, (e.g., all network members may have a matching copy of the whole ledger at any specific instance). Furthermore, a distributed ledger system may provide the ability for storing, recording, and exchanging of digital information across different, consenting parties without the need for a centralized authority or record-keeper.

Furthermore, a hybrid blockchain technology may combine elements of both private and public blockchain networks. For example, a hybrid blockchain network may have a private, permission-based system alongside a public permissionless system. A hybrid blockchain network may also include functionality for controlling which data is accessible to specific users in the blockchain, and which data is publicly available. For example, transactions and records in a hybrid blockchain may not be made public but may be verified when requested, such as by allowing access through a smart contract. Confidential information may be kept inside the network while still allowing verification of the confidential information. Likewise, a hybrid blockchain technology may also prevent a private entity that owns the hybrid blockchain network from altering transactions.

In some embodiments, a distributed ledger technology includes a mainchain for implementing the distributed ledger. However, some embodiments are contemplated that use a separate chain for each application or pipe component, where individual chains may validate respective transactions on the mainchain after a particular epoch time/number of transactions.

Turning to control systems, a network may include various control systems (e.g., control system O (160)) that include functionality for transporting pipe components, performing inspection operations, performing installation operations, and performing other pipe operations. In some embodiments, for example, a manufacturer server or a distributor server may transmit commands (e.g., command (187)) to various control systems to manage transportation of a pipe component through a supply chain. If a received pipe component does not match a requested pipe component, a distributor server may transmit a command that sends the pipe component to a predetermined return location. On the other hand, a distributor server may transmit a command that causes a pipe component received at a distribution center to be transferred to a final installation location if the received pipe component matches a requested pipe component. Control systems may include a programmable logic controller (PLC), a distributed control system (DCS), a supervisory control and data acquisition (SCADA), and/or a remote terminal unit (RTU). A distributed control system may be a computer system for managing various processes at various facilities using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
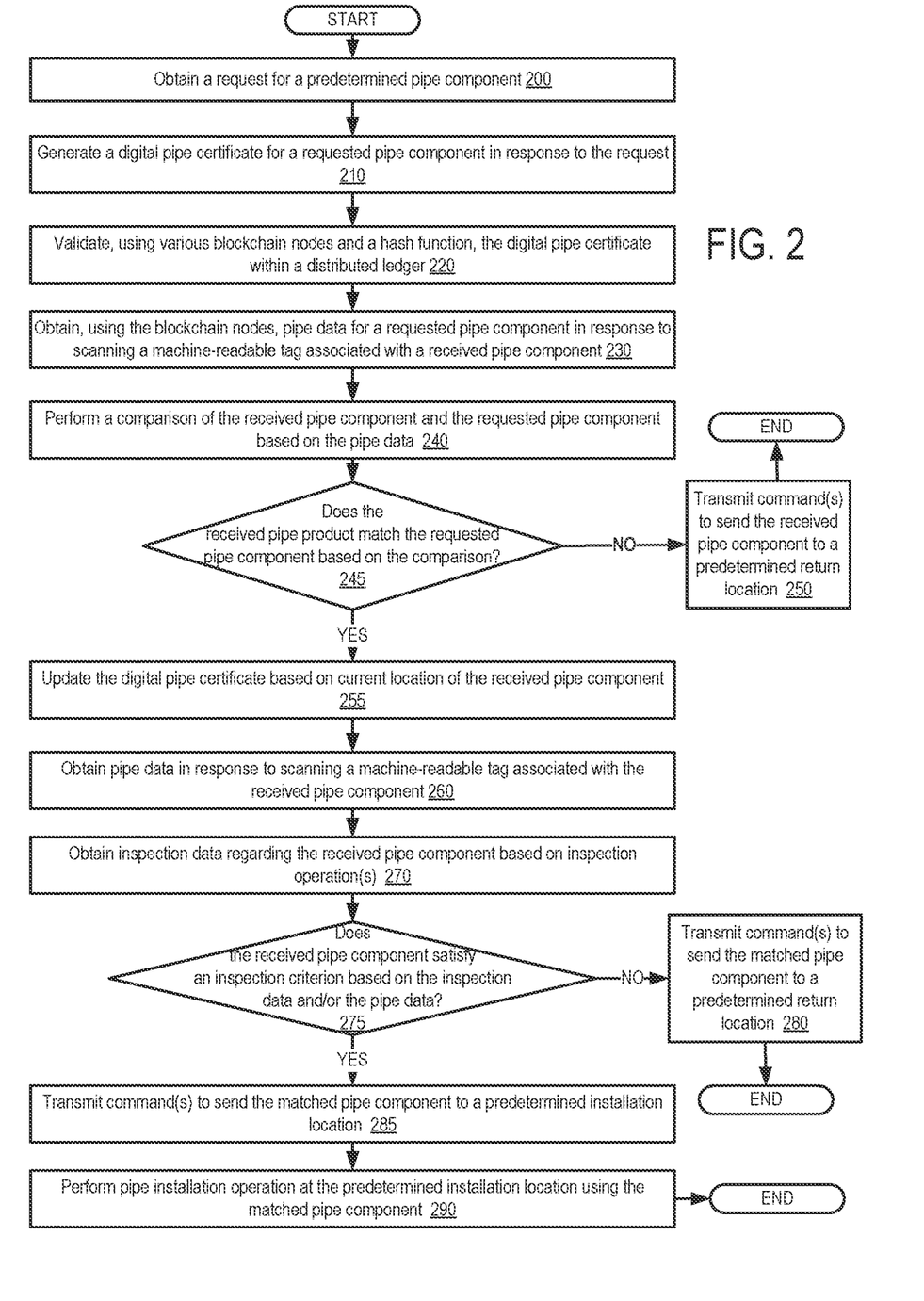
FIG. 2 shows a flowchart in accordance with one or more embodiments.

Turning to FIG. 2, FIG. 2 shows a flowchart in accordance with one or more embodiments. Specifically, FIG. 2 describes a general method for managing pipe components using digital pipe certificates. One or more blocks in FIG. 2 may be performed by one or more components (e.g., manufacturer server B (140), distributor server D (150), and/or user device C (170)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a request is obtained for a predetermined pipe component in accordance with one or more embodiments. For example, a user device may transmit a request over a network to a manufacturer server or another server that triggers a manufacturing operation. The request may include various pipe specifications associated with the pipe component, such as pipe material data, pipe dimension data, and other pipe requirements, such as inspection criteria for the pipe component.

In Block 210, a digital pipe certificate is generated for a requested pipe component in response to a request in accordance with one or more embodiments. In particular, the digital pipe certificate may include pipe data, such as pipe material data, pipe dimension data, inspection criteria, pipe transaction data, and data regarding the requesting entity, the pipe manufacturer, and various distributors associated with delivering the pipe component to a predetermined installation location. For example, the digital pipe certificate may be generated by a manufacturer server in response to receiving a request for a pipe component or after manufacturing the pipe component.

In some embodiments, a digital pipe certificate is associated with a machine-readable tag coupled to a pipe component. The machine-readable tag may be a physical tag, such as a RFID tag, a smart label, a barcode, or another machine-readable label that is capable of being scanned by a camera device. By associating the digital pipe certificate with a machine-readable tag, integrity between the digital pipe certificate and the physical pipe components may be maintained throughout delivery of the component through a supply chain. Likewise, the digital pipe certificate may provide protection from tampering by having digital pipe certificates maintained in decentralized locations and outside the control of the distributors, manufacturers, and other third parties responsible for delivering the pipe component.

In Block 220, a digital pipe certificate is validated within a distributed ledger using various blockchain nodes and a hash function in accordance with one or more embodiments. During the validation process, digital pipe certificates are written a distributed ledger shared among various blockchain nodes. For example, a manufacturer server or a customer's user device may write the initial certificate using digital cryptography and digital signatures. Accordingly, a hash value will be generated by the blockchain nodes for a respective digital pipe certificate using a hash function. The party that generates the digital pipe certificate may sign the certificate with a private key. If the party is a manufacturer, the manufacturer may also attach the manufacturer public key to the certificate. In some embodiments, digital pipes certificates are written to ledger immutably by certified manufacturers of pipe components, thus allowing such certificates to be verified and stored by all network participants using a blockchain consensus.

Figure 3:
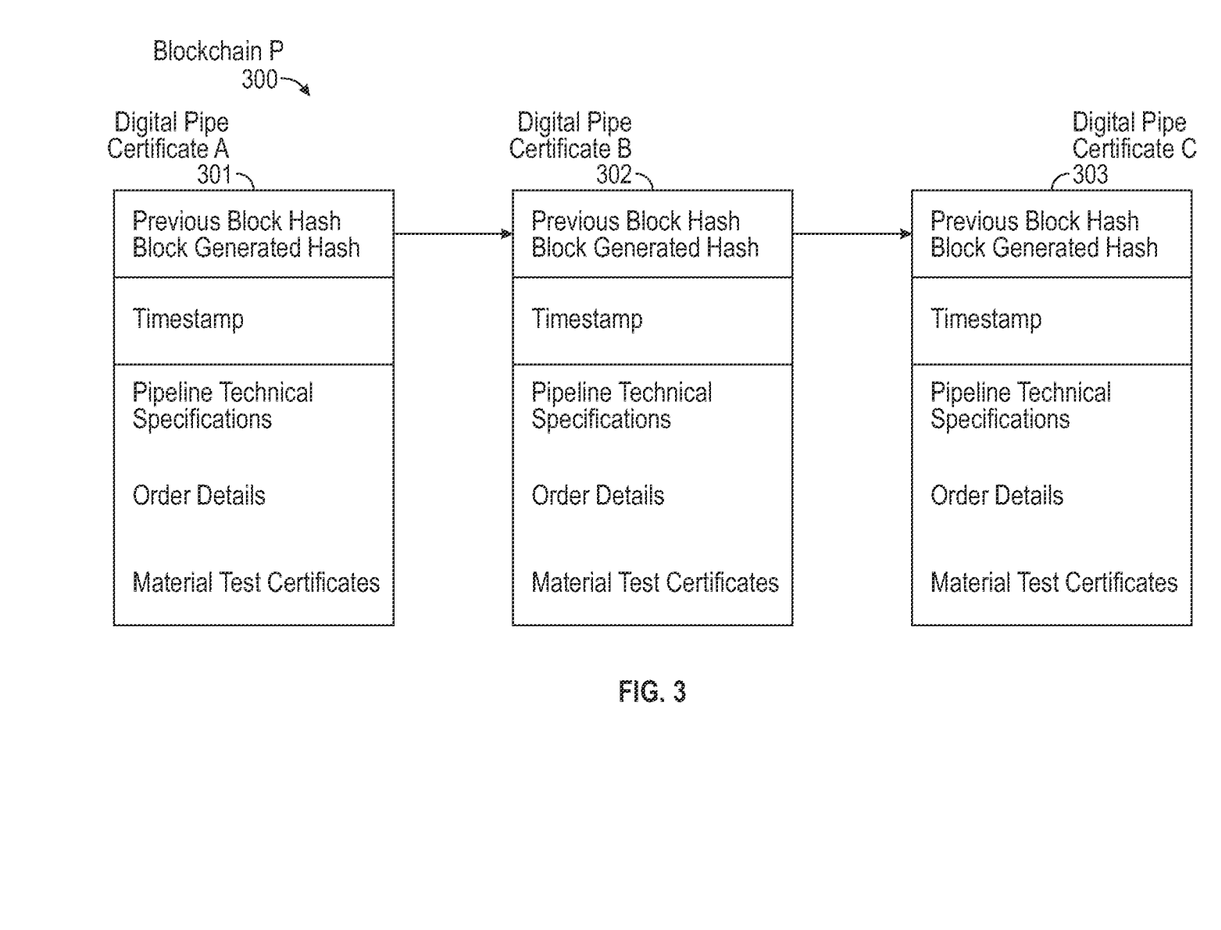
FIGS. 3 and 4 show examples in accordance with one or more embodiments.

Turning to FIG. 3, FIG. 3 provides an example of a blockchain P (300) in accordance with some embodiments. In particular, blockchain P (300) includes various digital pipe certificates, i.e., digital pipe certificate A (301), digital pipe certificate B (302), and digital pipe certificate C (303). For illustration, digital pipe certificate A (301) includes pipe data, such as pipeline technical specifications, order details, and material test certificates. Likewise, digital pipe certificate A (301) also includes various blockchain record information, such as timestamps, the previous block hash value, and the certificate's own block generated hash value.

Returning to FIG. 2, in Block 230, pipe data are obtained for a requested pipe component using various blockchain nodes in response to scanning a machine-readable tag associated with a received pipe component in accordance with one or more embodiments. For example, data from a digital pipe certificate may be accessed from a blockchain network by scanning the machine-readable tag. In some embodiments, for example, the machine-readable tag includes a cryptographic public key or other blockchain information for accessing data, such as pipe data, from a distributed ledger.

In Block 240, a comparison of a received pipe component and a requested pipe component is performed based on pipe data in accordance with one or more embodiments. After a pipe component is received at a particular location, a matching process may be performed using pipe data from the received pipe component and pipe data from a digital pipe certificate. In particular, physical specifications of the received pipe component may be compared with pipe data (e.g., material technical specification and material test certificates) from the digital pipe certificate.

In Block 245, a determination is made whether a received pipe component matches a requested pipe component based on a comparison in accordance with one or more embodiments. For example, a server or another network device may analyze a received pipe component based on one or more comparisons with pipe data from the digital pipe certificate. If a determination is made that the received pipe component and a requested pipe certificate associated with the certificate do not match, the process may proceed to Block 250. If a determination is made that the received pipe component and the requested pipe component match, the process may proceed to Block 255.

In Block 250, one or more commands are transmitted that send a received pipe component to a predetermined return location in accordance with one or more embodiments. For example, a server that determines the received pipe component is different from the requested pipe component may transmit one or more commands to initiate an operation to return the received pipe component back to the manufacturer. Thus, a server may coordinate with one or more control systems and/or user devices to reroute the received pipe component to a different location rather than the pipe's original installation site.

In Block 255, a digital pipe certificate is updated based on a current location of a pipe component in accordance with one or more embodiments. More specifically, a digital pipe certificate may be updated with various pipe transaction data describing the pipe component's history. Pipe transaction data may describe a pipe component's arrival or departure from a specific location in a supply chain. Likewise, pipe transaction data in a digital pipe certificate may describe the pipe history, such as whether the received pipe component matched the requested pipe specifications at different locations. Moreover, the pipe transactions may include data for various inspection operations performed on the pipe component at different times by different inspection entities, such as whether the pipe component has been damaged. As such, the digital pipe certificate may be updated periodically based on different entities receiving custody of the respective pipe component. Accordingly, a user device may monitor updates of pipe transactions regarding a particular pipe component while the pipe component moves through a supply chain.

In Block 260, pipe data are obtained in response to scanning a machine-readable tag associated with a received pipe component in accordance with one or more embodiments. In particular, Block 260 may be similar to Block 230 and the accompanying description.

In Block 270, inspection data are obtained regarding a received pipe component based on one or more inspection operations in accordance with one or more embodiments. Inspection processes may be performed at different supply chain locations, such as by distributors and customers prior to the installation of a pipe.

In Block 275, a determination is made whether a received pipe component satisfies an inspection criterion based on inspection data and/or pipe data in accordance with one or more embodiments. Inspection criteria may include the requested material type and/or dimensions of the requested pipe component. Inspection criteria may also include the condition of the received pipe, such as whether the pipe component has experienced damage during transportation of the pipe component. Inspection operations may identify whether the pipe component has been improperly handled or packaged prior to delivery to the current location. Likewise, a digital pipe certificate may be updated using the results of one or more inspection operations. If a determination is made that the received pipe component fails one or more inspection criteria, the process may proceed to Block 280. If a determination is made that the received pipe component satisfies one or more inspection criteria, the process may proceed to Block 285.

In some embodiments, matching processes and/or inspection processes are performed using one or more smart contracts stored in a blockchain. For example, a server may transmit pipe data and/or inspection data based on a received pipe component to a blockchain network. Blockchain nodes in the blockchain network may perform a verification of the pipe data and/or inspection data using one or more smart contracts. Thus, the blockchain may provide a message indicating whether a received pipe component matches a requested pipe component. Likewise, the blockchain may also automatically determine whether a received component passes an inspection operation. For example, an inspector may not have access to the inspection criteria for a particular received pipe component. By transmitting pipe data to the blockchain network, only certain entities may be aware of the inspection criteria and thus the inspector cannot fraudulently pass the received pipe component as being compliant with the inspection.

In Block 280, one or more commands are transmitted that send a received pipe component to a predetermined return location in accordance with one or more embodiments.

In Block 285, one or more commands are transmitted that send a received pipe component to a predetermined installation location in accordance with one or more embodiments.

In Block 290, a pipe installation operation is performed at a predetermined installation location using a matched pipe component in accordance with one or more embodiments. For example, the received pipe component may be installed in various industrial plants, at well sites, and many other locations that use pipes in their industry.

Figure 4:
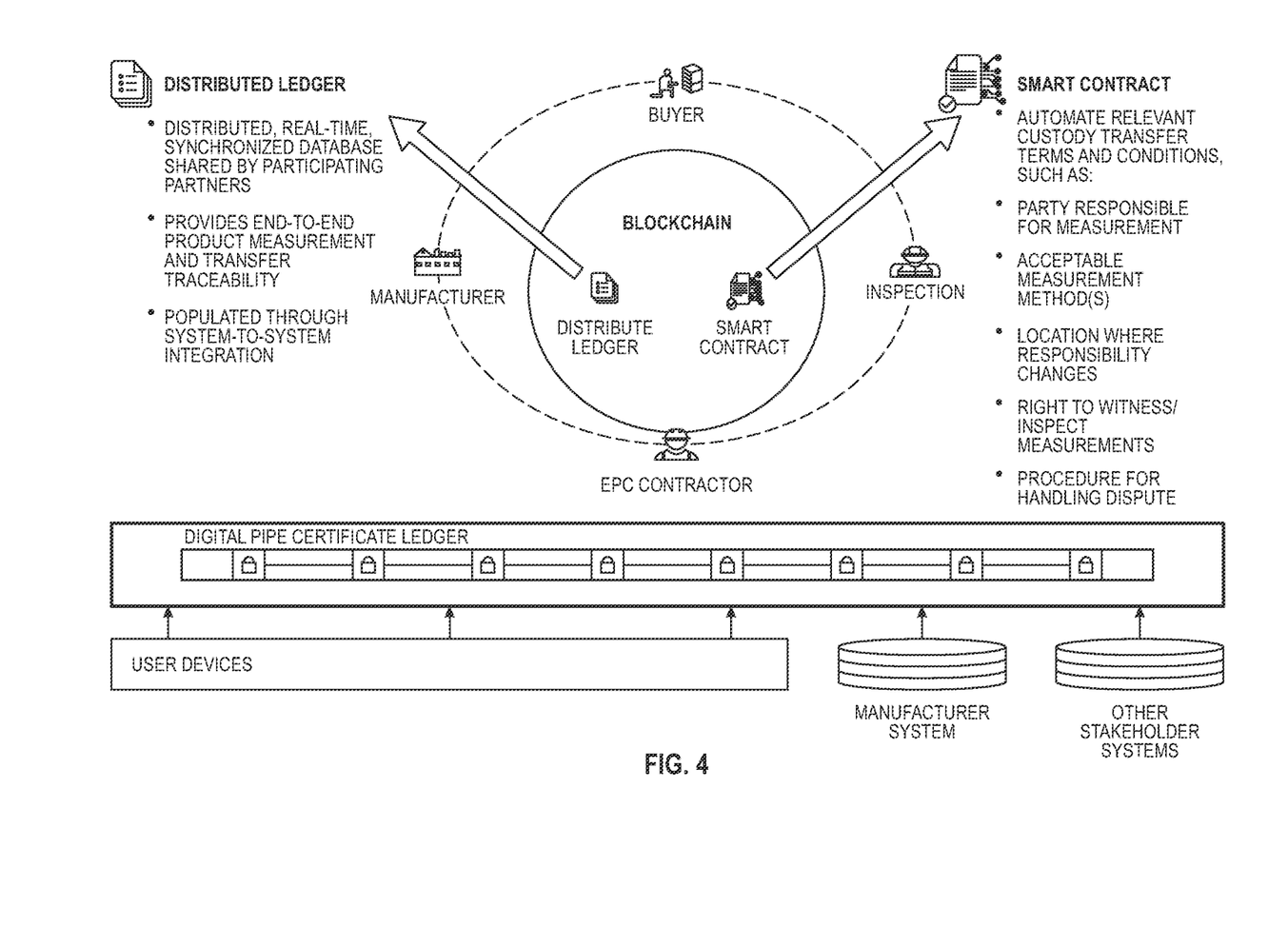

Turning to FIG. 4, FIG. 4 describes a pipeline procurement lifecycle in accordance with one or more embodiments. As shown in FIG. 4, pipe data for a particular pipeline will be captured in various digital pipe certificates and stored in a distributed ledger to provide a comprehensive pipeline material procurement record. Digital pipe certificates may be maintained through interaction based on user interfaces or through integration with participants control systems and/or servers. Validation of a digital certificate may be determined based on predefined criteria coded into a smart contract.

Figure 5:
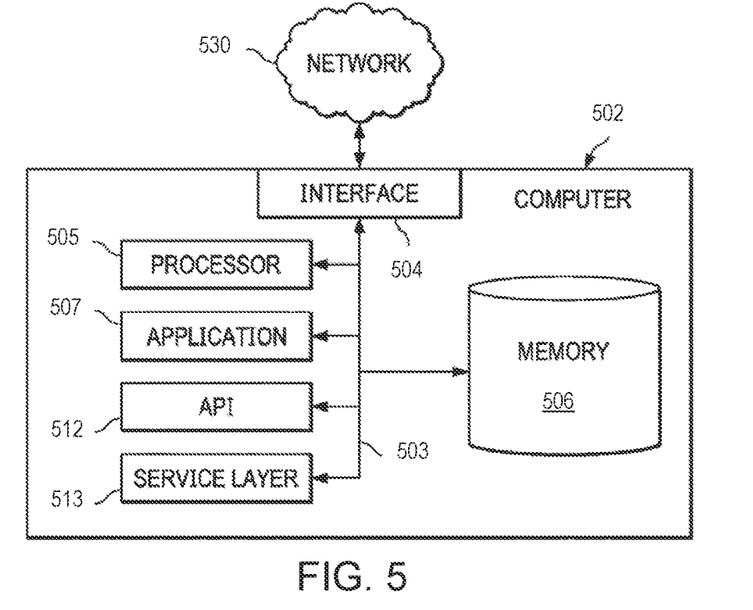
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, server, desktop computer, laptop/notebook computer, wireless data port, smart phone, personal data assistant (PDA), tablet computing device, one or more computer processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single processor (505) in FIG. 5, two or more computer processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:
1. A system, comprising:
a user device;
a plurality of blockchain nodes coupled over a network, wherein a respective blockchain node among the plurality of blockchain nodes comprises a distributed ledger,
wherein the distributed ledger comprises a smart contract; and
a first server coupled to the user device and the plurality of blockchain nodes over the network, wherein the first server comprises a first computer processor and is configured to:
  obtain, from the user device, a first request for a first pipe component comprising a first pipe material type and a first pipe dimension,
  obtain first pipe data in response to a scan of a first machine-readable tag associated with a received pipe component, wherein the first pipe data comprises a second pipe material type of the received pipe component and a second pipe dimension of the received pipe component,
  perform a comparison of the received pipe component and the first pipe component using the plurality of blockchain nodes, the first pipe data, and a first digital pipe certificate that is disposed in the distributed ledger,
  wherein the comparison is performed with the plurality of blockchain nodes by executing a first blockchain transaction using the smart contract,
  wherein the first blockchain transaction compares the first pipe material type and the first pipe dimension of the first pipe component that are stored in the first digital pipe certificate with the second pipe material type and the second pipe dimension associated with the received pipe component,
  wherein the first digital pipe certificate is generated in response to the first request by the user device for the first pipe component,
  determine whether the received pipe component matches the first pipe component based on the comparison of the received pipe component and the first pipe component,
  transmit, in response to the received pipe component not matching the first pipe component, a first com- mand that sends the received pipe component to a predetermined return location,
obtain first inspection data regarding a third pipe component associated with a second digital pipe certificate that is disposed in the distributed ledger,
determine whether the third pipe component satisfies a predetermined inspection criterion based on the first inspection data,
wherein determining whether the third pipe component satisfies the predetermined inspection criterion comprises executing a second blockchain transaction with the plurality of blockchain nodes using the smart contract and the first inspection data, and
transmit, in response to the third pipe component satisfying the predetermined inspection criterion, a second command that causes a pipe installation operation to be performed using the third pipe component.

2. The system of claim 1, further comprising:
a second server coupled to the user device and the plurality of blockchain nodes over the network,
wherein the second server comprises a second computer processor and is configured to:
obtain, from the user device, a second request for a second pipe component,
generate a third digital pipe certificate that is associated with the second pipe component, and
validate, using the plurality of blockchain nodes, the third digital pipe certificate within the distributed ledger,
wherein the third digital pipe certificate is validated using the plurality of blockchain nodes and a hash function, and
wherein the pipe component comprises a second machine-readable tag that is associated with the third digital pipe certificate.

3. The system of claim 1, further comprising:
a radio frequency identification (RFID) transceiver coupled to the first server,
wherein the first machine-readable tag is an RFID tag, and
wherein the scan is performed by the RFID transceiver.

4. The system of claim 1, further comprising:
a camera device coupled to the first server,
wherein the first machine-readable tag comprises a quick response (QR) code, and
wherein the scan is performed by the camera device.

5. The system of claim 1,
wherein the first server further comprises a blockchain wallet that stores a cryptographic public key and a cryptographic private key,
wherein the first server is further configured to:
obtain the first pipe data from the plurality of blockchain nodes using the cryptographic public key, and
update the first digital pipe certificate using the cryptographic private key in response to sending the received pipe component to a predetermined return location.

6. The system of claim 1, wherein the first server is further configured to:
obtain second inspection data regarding a fourth pipe component associated with a third digital pipe certificate;
determine whether the fourth pipe component satisfies the predetermined inspection criterion based on the second inspection data, and
transmit, in response to the fourth pipe component failing to satisfy the predetermined inspection criterion, a third command that sends the fourth pipe component to the predetermined return location.

7. A method, comprising:
obtaining, from a user device, a first request for a first pipe component comprising a first pipe material type and a first pipe dimension;
generating, by a first server, a first digital pipe certificate associated with the first pipe component;
validating, using a plurality of blockchain nodes and a hash function, the first digital pipe certificate within a distributed ledger, wherein the distributed ledger comprises a smart contract;
obtaining, by a second server and using the plurality of blockchain nodes, first pipe data in response to a scan of a machine-readable tag associated with a received pipe component, wherein the first pipe data comprises a second pipe material type of the received pipe component and a second pipe dimension of the received pipe component;
performing, by the second server, a comparison of the received pipe component and the first pipe component the first pipe data and the first digital pipe certificate,
wherein the comparison is performed with the plurality of blockchain nodes by executing a first blockchain transaction using the smart contract,
wherein the first blockchain transaction compares the first pipe material type and the first pipe dimension of the first pipe component that are stored in the first digital pipe certificate with the second pipe material type and the second pipe dimension associated with the received pipe component;
determining, by the second server, whether the received pipe component matches the first pipe component based on the comparison of the received pipe component and the first pipe component;
transmitting, by the second server and in response to the received pipe component not matching the first pipe component, a first command that sends the received pipe component to a predetermined return location,
obtaining, by the second server, first inspection data regarding a third pipe component associated with a second digital pipe certificate that is disposed in the distributed ledger;
determining, by the second server, whether the third pipe component satisfies a predetermined inspection criterion based on the first inspection data,
wherein determining whether the third pipe component satisfies the predetermined inspection criterion comprises executing a second blockchain transaction with the plurality of blockchain nodes using the smart contract and the first inspection data, and
transmitting, by the second server in response to the third pipe component satisfying the predetermined inspection criterion, a second command that causes a pipe installation operation to be performed using the third pipe component.

8. The method of claim 7,
wherein the scan is performed by a radio frequency identification (RFID) transceiver, and
wherein the machine-readable tag is an RFID tag.

9. The method of claim 7, further comprising:
obtaining the first pipe data from the plurality of blockchain nodes using a cryptographic public key, and updating the first digital pipe certificate using a cryptographic private key in response to sending the received pipe component to a predetermined return location, wherein the first server further comprises a blockchain wallet that stores the cryptographic public key and the cryptographic private key.

10. The method of claim 7, further comprising:

obtaining second inspection data regarding a fourth pipe component associated with a third digital pipe certificate;

determining whether the fourth pipe component satisfies the predetermined inspection criterion based on the second inspection data; and transmitting, in response to the fourth pipe component failing to satisfy the predetermined inspection criterion, a command that sends the fourth pipe component to the predetermined return location.

11. A server, comprising:

a computer processor; and a memory coupled to the computer processor, the memory comprising instructions executable by the computer processor and configured to:

obtain, from a user device, a request for a first pipe component comprising a first pipe material type and a first pipe dimension, generate, in response to obtaining the request for the first pipe component, a first digital pipe certificate in a distributed ledger that is associated with the first pipe component, wherein the distributed ledger comprises a smart contract, validate, using a plurality of blockchain nodes, the first digital pipe certificate within the distributed ledger, and transmit a first command that sends the first pipe component to a predetermined destination location, obtain first pipe data in response to a scan of a machine-readable tag associated with a received pipe component, wherein the first pipe data comprises a second pipe material type of the received pipe component and a second pipe dimension of the received pipe component, perform a comparison of the received pipe component and the first pipe component using the plurality of blockchain nodes, the first pipe data, and the first digital pipe certificate, wherein the comparison is performed with the plurality of blockchain nodes by executing a first blockchain transaction using the smart contract, and wherein the first blockchain transaction compares the first pipe material type and the first pipe dimension of the first pipe component that are stored in the first digital pipe certificate with the second pipe material type and the second pipe dimension associated with the received pipe component, determine whether the received pipe component matches the first pipe component based on the comparison of the received pipe component and the first pipe component, transmit, in response to the received pipe component not matching the first pipe component, a second command that sends the received pipe component to a predetermined return location, obtain inspection data regarding a third pipe component associated with a second digital pipe certificate that is disposed in the distributed ledger, determine whether the third pipe component satisfies a predetermined inspection criterion based on the inspection data, wherein determining whether the third pipe component satisfies the predetermined inspection criterion comprises executing a second blockchain transaction with the plurality of blockchain nodes using the smart contract and the inspection data, and transmit, in response to the third pipe component satisfying the predetermined inspection criterion, a third command that causes a pipe installation operation to be performed using the third pipe component, wherein a respective blockchain node among the plurality of blockchain nodes comprises the distributed ledger.

12. The server of claim 11, wherein the machine-readable tag is an RFID tag.

* * * * *